(12) United States Patent
Smith

(10) Patent No.: US 11,673,420 B2
(45) Date of Patent: Jun. 13, 2023

(54) LAYOUT TOOL WITH GRIPS

(71) Applicant: JessEm Tool Corporation, Moncton (CA)

(72) Inventor: Darrin E. Smith, New Brunswick (CA)

(73) Assignee: Jessem Tool Corporation

( * ) Notice: Subject to any disclaimer, the term of this patent is extended or adjusted under 35 U.S.C. 154(b) by 128 days.

(21) Appl. No.: 17/106,548

(22) Filed: Nov. 30, 2020

(65) Prior Publication Data

US 2022/0169065 A1 Jun. 2, 2022

(51) Int. Cl.
| | |
|---|---|
| *B43L 7/00* | (2006.01) |
| *G01B 3/04* | (2006.01) |
| *B43L 7/027* | (2006.01) |
| *B25H 7/02* | (2006.01) |

(52) U.S. Cl.
CPC .................. *B43L 7/00* (2013.01); *B25H 7/02* (2013.01); *B43L 7/007* (2013.01); *B43L 7/0275* (2013.01); *G01B 3/04* (2013.01)

(58) Field of Classification Search
CPC .......... B43L 7/007; B43L 7/0275; G01B 3/04
See application file for complete search history.

(56) References Cited

U.S. PATENT DOCUMENTS

| | | | | |
|---|---|---|---|---|
| 806,546 | A | | 12/1905 | Lawless |
| 3,178,826 | A | | 4/1965 | Aisen |
| 5,471,749 | A | * | 12/1995 | Brady ..................... B43L 12/00 |
| | | | | 33/562 |
| 5,615,488 | A | * | 4/1997 | Brady ..................... B26B 29/06 |
| | | | | 33/562 |
| 6,314,653 | B1 | * | 11/2001 | Iso ............................ B43L 7/00 |
| | | | | 33/484 |
| 6,782,629 | B2 | * | 8/2004 | Jimenez .................. B43L 7/005 |
| | | | | 33/483 |
| 7,032,319 | B2 | * | 4/2006 | Ollgaard .................. B43L 7/00 |
| | | | | 33/483 |
| 7,621,056 | B2 | * | 11/2009 | Iso ............................ B43L 7/00 |
| | | | | 33/483 |
| 7,774,948 | B1 | | 8/2010 | Bareis |
| 7,958,646 | B2 | * | 6/2011 | So .......................... B43L 7/007 |
| | | | | 33/562 |
| 10,538,125 | B1 | | 1/2020 | Smith |

(Continued)

FOREIGN PATENT DOCUMENTS

| | | | |
|---|---|---|---|
| JP | 1111087 A | 6/1997 | |
| WO | WO-03066348 A1 * | 8/2003 | ............. B43L 12/00 |

OTHER PUBLICATIONS

Ruler With Grip Rubber Base Cutting Guide For Plate, AKIFIX, Sep. 16, 2020, 2 pages.

(Continued)

*Primary Examiner* — Yaritza Guadalupe-McCall
(74) *Attorney, Agent, or Firm* — Stinson LLP

(57) ABSTRACT

A layout tool is provided for use in marking a work piece to be cut. The layout tool includes a generally flat body having an even surface, a linear edge, locating indicia adjacent the linear edge, and a gripper attached to the flat body. The gripper is movable from an initial position. In the initial position, the gripper is generally aligned with the even surface of the flat body. The gripper can be moved toward the work piece from the initial position to engage the work piece when the flat body overlies the work piece.

43 Claims, 13 Drawing Sheets

(56) References Cited

U.S. PATENT DOCUMENTS

| 11,279,054 B2* | 3/2022 | Moser | G01B 3/002 |
| 2003/0054296 A1 | 3/2003 | Howell | |
| 2006/0070252 A1 | 4/2006 | Verdura et al. | |
| 2006/0277779 A1 | 12/2006 | Bauer | |
| 2011/0088270 A1* | 4/2011 | So | B43L 7/007 |
| | | | 33/484 |
| 2022/0169065 A1* | 6/2022 | Smith | B43L 7/00 |

OTHER PUBLICATIONS

Westcott 12 Stainless Steel Wave Ruler with Rubber Grip, Ramrock School & Office Supplies, Sep. 16, 2020, 6 pages.
Shinwa 24 Extruded Aluminum Cutting Rule Ruler Gauge with Non Slip Rubber Backing 33295, Amazon, Sep. 16, 2020, 7 pages.
Plastic Ruler with Rubber Finger Grip by Westcott ACM15501, OnTimeSupplies.com, Sep. 16, 2020, 2 pages.

* cited by examiner

LAYOUT TOOL WITH GRIPS

FIELD

The present disclosure generally relates to a layout tool for a work piece and more particularly to a layout tool with grips.

BACKGROUND

Layout tools, such as rulers and squares (e.g., L-shaped squares, triangle squares, etc.), are commonly used as a measuring, cutting and/or drawing tool as a reference and markup guide for marking up a work piece.

SUMMARY

In one aspect, a layout tool for use in marking a work piece to be cut comprises a generally flat body having an even surface, a linear edge and locating indicia adjacent the linear edge. A gripper is attached to the flat body. The gripper is movable from an initial position. In the initial position, the gripper is generally aligned with the even surface of the flat body. The gripper is configured to be moved toward the work piece from the initial position to engage the work piece when the flat body overlies the work piece.

In another aspect, a layout tool for use in marking a work piece to be cut comprises a flat body having a linear edge and locating indicia adjacent the linear edge. The flat body has opposite first and second surfaces. The flat body has a first grip on the first surface and a second grip on the second surface. The first grip begins at the first surface and extends into the flat body. The second grip begins at the second surface and extends into the flat body.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

The layout tools disclosed herein assist a user in marking up a work piece (not shown). The work piece may include a piece of lumber, a board, a panel, a plate or any other suitable item a user may want to mark up. For example, the layout tools disclosed herein may be used to place a cut marking on a piece of lumber indicating where a cut is to be made. The layout tools of the present disclosure include rulers, triangle squares and L-shaped square, although other types of layout tools (e.g., measurement tools) are within the scope of the present disclosure. Moreover, it is understood the teachings set forth herein can also be applied to other types of tools.

Figure 1:
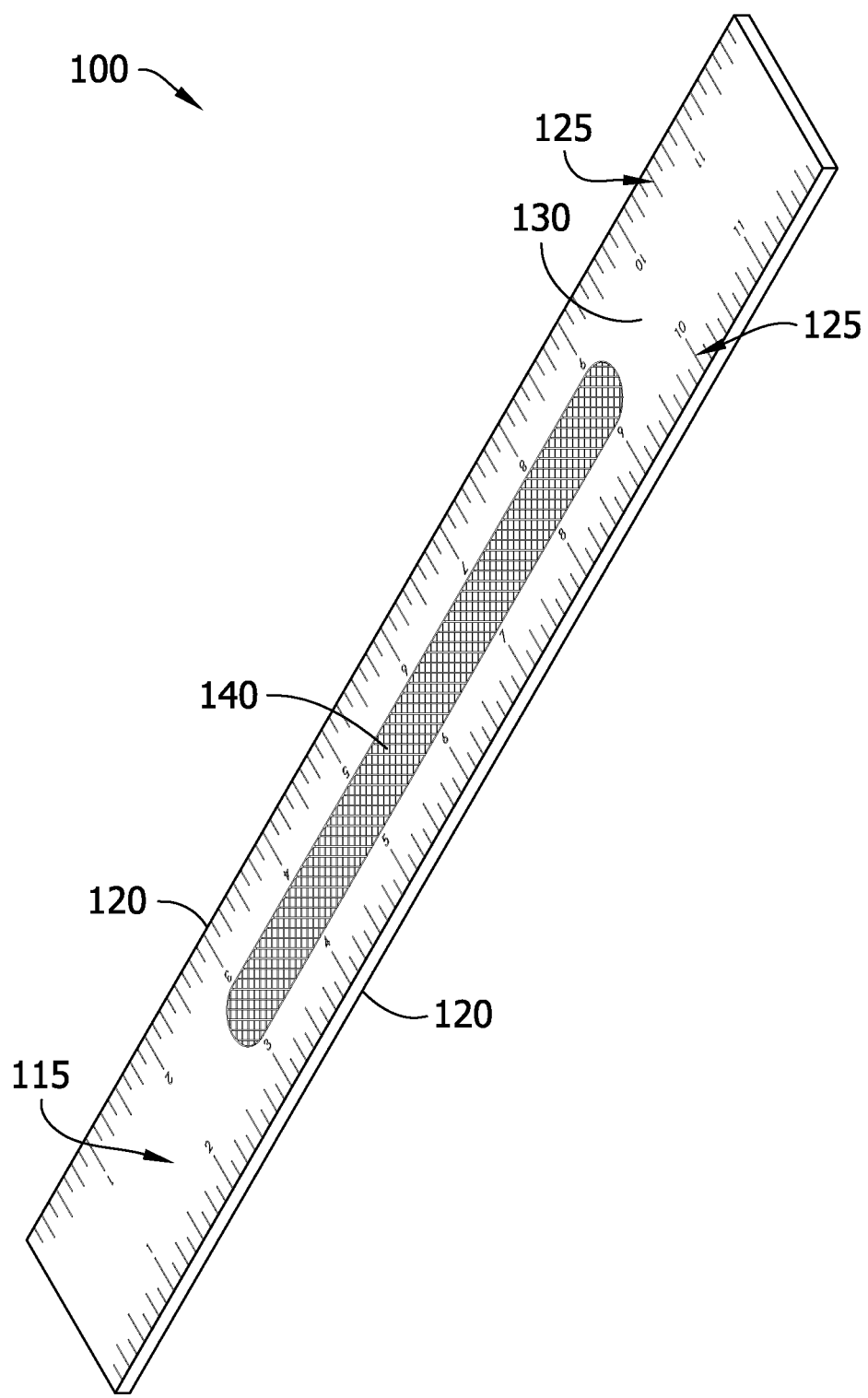
FIG. 1 is a top perspective of a ruler layout tool according to one embodiment of the present disclosure.
Figure 2:
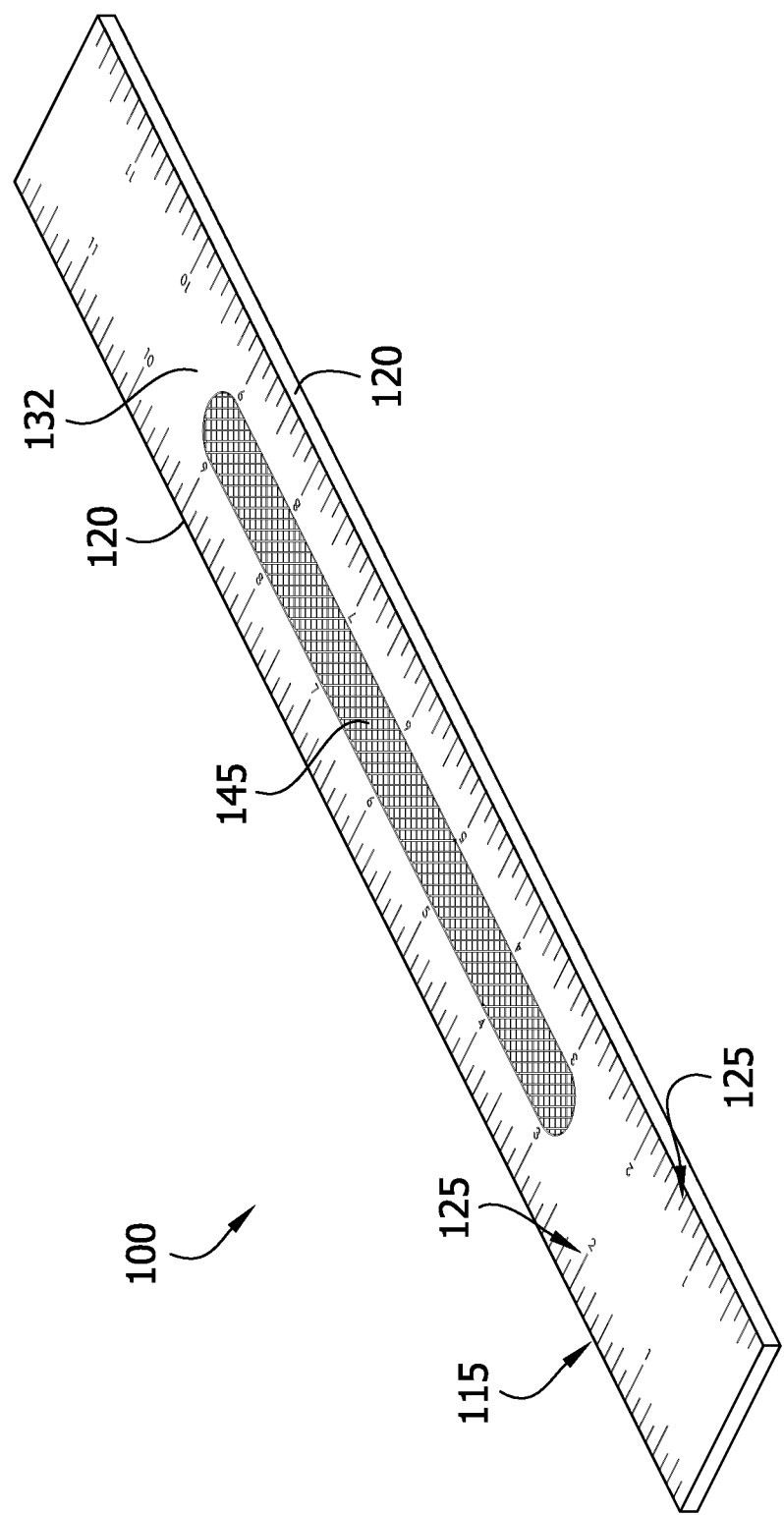
FIG. 2 is a bottom perspective thereof.

Referring to FIGS. 1 and 2, a layout tool according to one embodiment of the present disclosure is generally indicated by reference numeral 100. In this embodiment, the layout tool 100 comprises a ruler. The layout tool 100 includes a generally flat or planar body 115. The flat body 115 is elongate. In the illustrated embodiment, the flat body 115 has a generally rectangular shape. The flat body 115 includes at least one linear edge 120 (e.g., side edge). In the illustrated embodiment, the flat body 115 includes opposite first and second linear edges 120. The two linear edges 120 are generally parallel to one another. Each linear edge 120 extends between opposite ends of the flat body 115. The flat body 115 has a first (e.g., upper) surface 130 and a second (e.g., bottom) surface 132 opposite the first surface 130. The first and second surfaces 130, 132 are generally flat and planar (broadly, "even"). The first and second surfaces 130, 132 extend between the first and second linear edges 120. The layout tool 100 includes locating indicia 125 adjacent each linear edge 120. Preferably, the locating indicia 125 comprises a measurement scale such as an English (e.g., inch) measurement scale or a metric (e.g., cm) measurement scale, although other types of locating indicia are within the scope of the present disclosure. In the illustrated embodiment, the locating indicia 125 is an inch measurement scale. Preferably, locating indicia 125 is included on both the first surface 130 and the second surface 132. In the illustrated embodiment, the layout tool 100 includes four locating indicia 125, two on the first surface 130 adjacent each linear edge 120 and two on the second surface 132 adjacent each linear edge 120. In one embodiment, the locating indicia 125 is formed on the flat body 115 by removing material from the flat body 115. For example, the locating indicia 125 may be formed by laser-etching, although other ways of forming the locating indicia are within the scope of the present disclosure.

The flat body 115 includes a first grip 140 on the first surface 130 and a second grip 145 on the second surface 132 (broadly, at least one grip). In other embodiments, the flat body 115 may only include a grip on only one of the first or second surface 130, 132. As shown, the first and second grips 140, 145 are each spaced apart from (e.g., disposed between) the locating indicia 125 on the respective first and second surfaces 130, 132. In the illustrate embodiment, the first and second grips 140, 145 are directly opposite one another. As a result, one grip 140, 145 is generally pushed into engagement with the work piece when the user engages the other grip. Preferably, the first and second grips 140, 145 are identical. Each grip 140, 145 is generally elongate and extends generally parallel to the length of the flat body 115. Each grip 140, 145 begins at its respective surface 130, 132 (e.g., respective first or second surface) and extends into the flat body 115 (e.g., toward the other surface). Accordingly, each grip 140, 145 is generally co-planar or even with its corresponding surface 130, 132. Thus, each grip 140, 145 is not disposed outward or exterior of the flat body 115 so that the grip does not cause any the layout tool 100 to be raised off the surface of the work piece. Preferably, each grip 140, 145 is formed on the flat body 115 by removing material from the flat body 115. For example, each grip 140, 145 may be formed by laser-etching, although other ways of forming each grip 140, 145 are within the scope of the present disclosure. In the illustrated embodiment, each grip 140, 145 comprises an etched surface such as cross-hatched, laser-etched surface that begins at the respective surface 130, 132 and extends into the flat body 115. Each etched surface comprises a set of intersecting grooves formed into the flat body 115 from the corresponding first or second surface 130, 132 of the flat body.

In one embodiment, the layout tool 100 (e.g., flat body 115) is a single, unitary piece of material. For example, the layout tool 100 can be made from a single piece of sheet metal or extruded aluminum. In another embodiment, the layout tool 100 can be formed from multiple pieces secured together.

In operation, the user lays the layout tool 100 onto a work piece. The layout tool 100 is laid onto the work piece on either the first surface 130 or the second surface 132 of the flat body 115. The user exerts force onto the flat body 115 to engage either the first grip 140 or the second grip 145 with the work piece. For example, the fingers of the user can exert force on the first grip 140, thereby pushing the second grip 145 into engagement with the work piece. The user utilizes the locating indicia 125 adjacent one of the linear edges 120 to mark the work piece appropriately and in the desired manner. For example, the user may mark the work piece at the location the user intends to cut.

Figure 3:
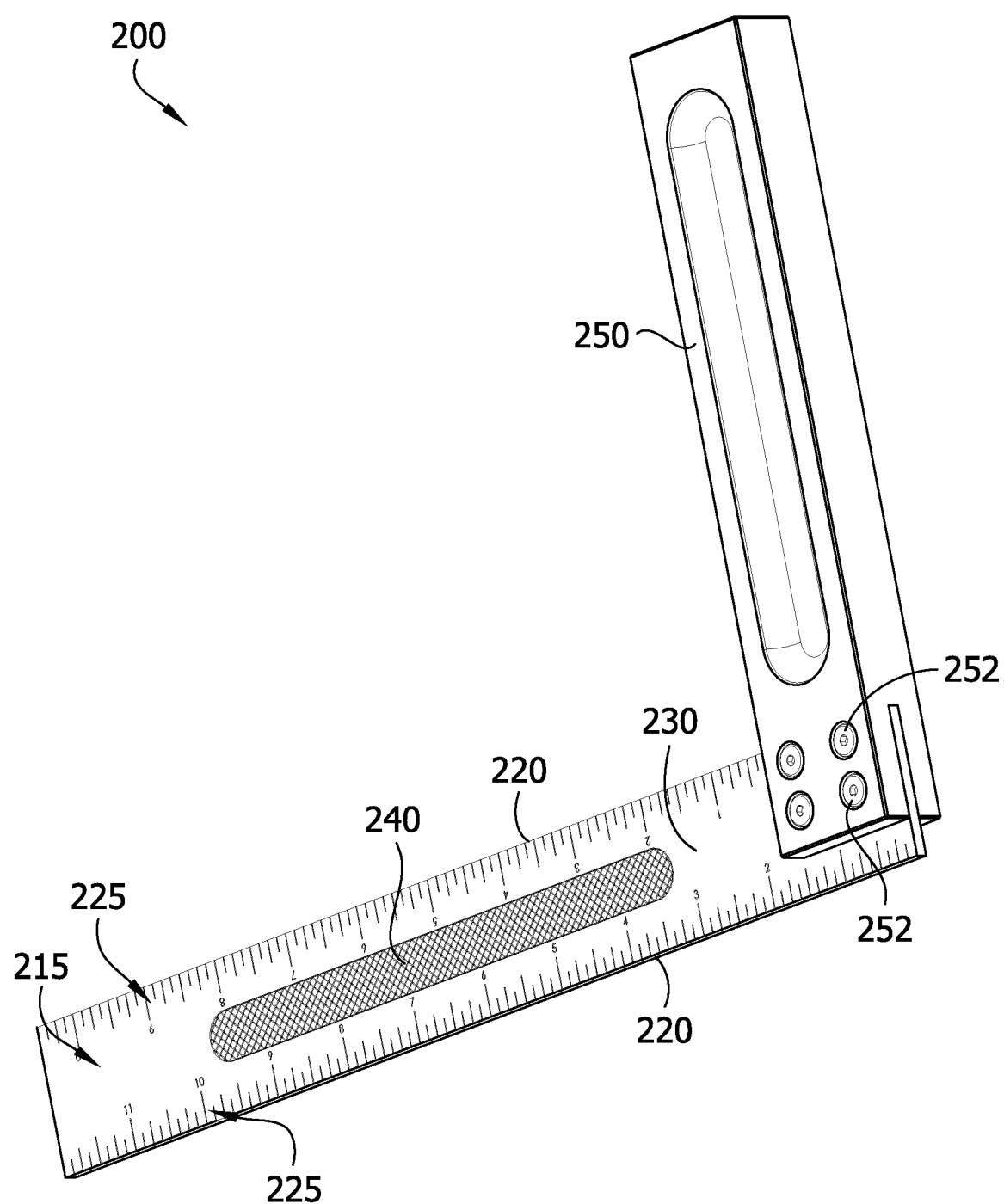
FIG. 3 is a top perspective of a L-shaped square layout tool according to one embodiment of the present disclosure.
Figure 4:
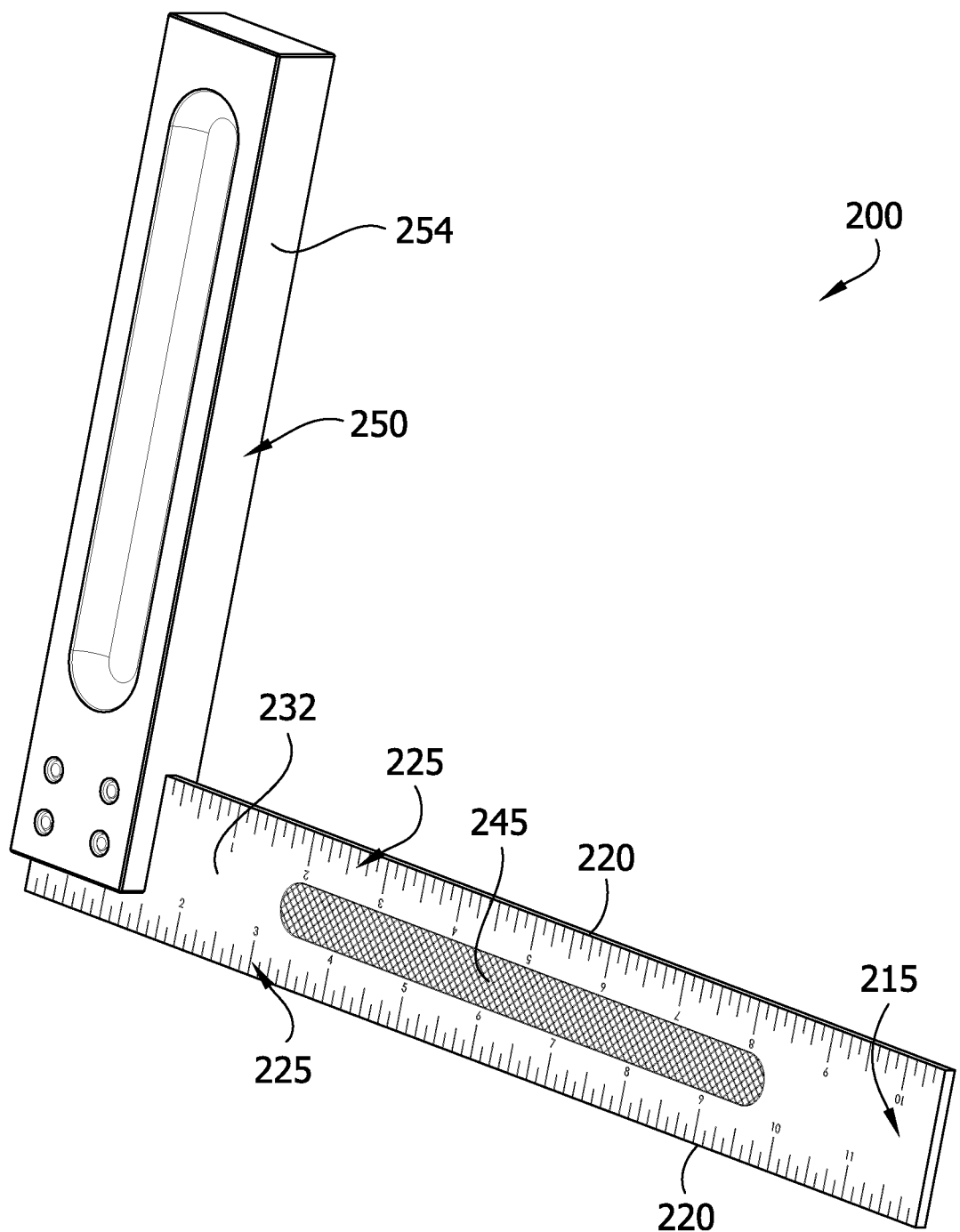
FIG. 4 is a bottom perspective thereof.

Referring to FIGS. 3 and 4, another embodiment of a layout tool according to the present disclosure is generally indicated by reference numeral 200. Layout tool 200 is generally analogous to layout tool 100 and, thus, for ease of description, where similar, analogous or identical parts are used, reference numerals "100" units higher are employed. Accordingly, unless clearly stated or indicated otherwise, the above descriptions regarding layout tool 100 also apply to layout tool 200.

In this embodiment, the layout tool 200 comprises an L-shaped square. The layout tool 200 includes an arm 250 extending perpendicularly from one end of the flat body 215. The flat body 215 forms one leg of the L-shaped square and the arm 250 forms the other leg of the L-shaped square. In the illustrated embodiment, the arm 250 is secured or fixed to the flat body 215 with one or more fasteners 252 (e.g., screws, bolts, etc.). Accordingly, in this embodiment, the layout tool 200 is made from multiple pieces connected together, although the flat body 215 is still a single, unitary piece of material. The arm 250 is thicker than the flat body 215 and therefore extends outward from the first surface 230 and the second surface 232. The arm 250 has a linear edge 254 that extends at a 90 degree angle relative to (e.g., from) one of the linear edges 220 of the flat body 215. Other angles are within the scope of the present disclosure. For example, the linear edge 254 of the arm 250 may extend at a 45 degree angle relative to a linear edge 220 of the flat body 215.

In operation, the user lays layout tool 200 onto a work piece. The layout tool 200 is laid onto the work piece on either the first surface 230 or the second surface 232. The linear edge 254 of the arm 250 may be abutted against the side or edge of the work piece to ensure the flat body 215 extends perpendicularly across the work piece relative to the edge of the work piece. The user exerts force onto the flat body 215 to engage either the first grip 240 or the second grip 245 with the work piece depending upon which one faces the work piece. The user utilizes the locating indicia 225 adjacent the linear edge 220 to mark the work piece appropriately.

Figure 5:
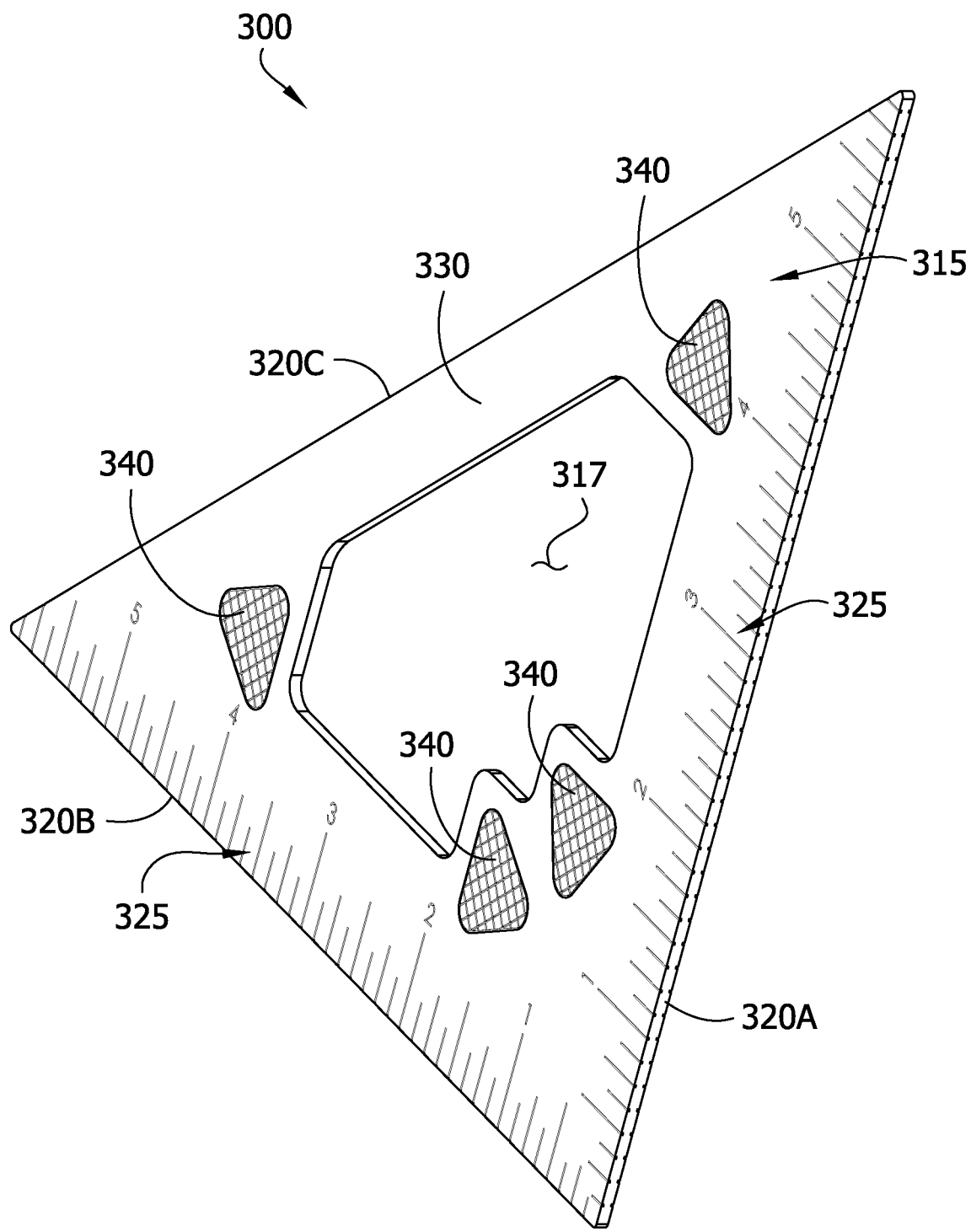
FIG. 5 is a perspective of a triangle square layout tool according to one embodiment of the present disclosure.

Referring to FIG. 5, another embodiment of a layout tool according to the present disclosure is generally indicated by reference numeral 300. Layout tool 300 is generally analogous to layout tool 100 and, thus, for ease of description, where similar, analogous or identical parts are used, reference numerals "200" units higher are employed. Accordingly, unless clearly stated or indicated otherwise, the above descriptions regarding layout tool 100 also apply to layout tool 300.

In this embodiment, the layout tool 300 comprises a triangle square. The flat body 315 has a triangle shape. The flat body 315 has two linear edges 320A, 320B that extend at a 90 degree angle relative to one another. These two linear edges 320A, 320B have locating indicia 325 adjacent to them. The flat body 315 also includes a third linear edge 320C extending at an angle to and between ends of the first two linear edges 320A, 320C, forming the hypotenuse of the triangle. There are no indicia adjacent the linear edge 320C. In one embodiment, the third linear edge 320C extends at a 45 degree angle to the other two linear edges 320A, 320B. Other configurations of the triangle shape are within the scope of the present disclosure. In the illustrated embodiment, the flat body 315 defines a central opening 317.

The layout tool 300 also includes four grips (e.g., four first grips, four second grips) 340, 345 on each side of the flat body 315 (the four second grips 345 are not shown but have essentially the same configuration). Each grip 340 is spaced apart and has a generally triangle shape. The grips 340 on each side of the flat body 315 are disposed or arranged to facilitate user hand/finger placement. Two grips 340 are spaced apart along and disposed next to the first linear edge 320A to position the user's hand/fingers along the first linear edge 320A when the user uses the first linear edge 320A for marking. Likewise, two grips 340 are spaced apart along and disposed next to the second linear edge 320B to position the user's hand/fingers along the second linear edge 320B when the user uses the second linear edge 320B for marking. Positioning the user's hand/fingers along the linear edge 320A, 320B the user wishes to use for marking makes it easier to position, hold and control the layout tool 300 on the work piece. Such positioning also helps keep the user's hand holding the layout tool 300 out of the way while the user is marking the work piece.

Referring to FIGS. 6-9, another embodiment of a layout tool according to the present disclosure is generally indicated by reference numeral 400. Layout tool 400 is generally analogous to layout tool 100 and, thus, for ease of description, where similar, analogous or identical parts are used, reference numerals "300" units higher are employed. Accordingly, unless clearly stated or indicated otherwise, the above descriptions regarding layout tool 100 also apply to layout tool 400.

Figure 7:
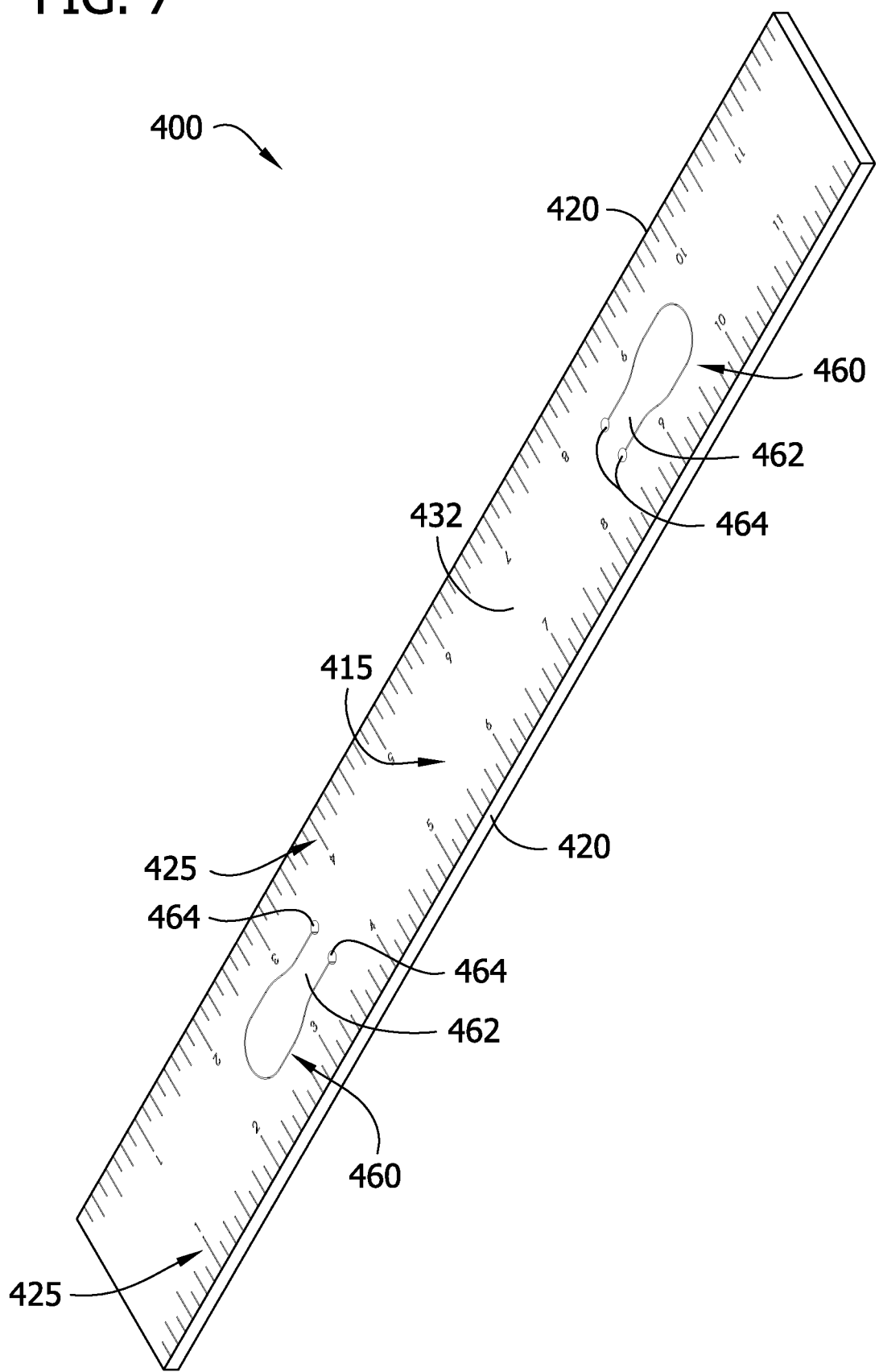
FIG. 7 is a bottom perspective thereof.

In this embodiment, the layout tool 400 comprises a ruler. In this embodiment, the layout tool 400 further includes at least one gripper 460 configured to facilitate the gripping of the work piece. In the illustrated embodiment, the layout tool 400 includes two grippers 460, although more or fewer grippers are within the scope of the present disclosure. The grippers 460 are generally identical (e.g., mirror images of one another) and thus one gripper will now be described with the understanding that the other gripper has essentially the same construction. The gripper 460 is attached to the flat body 415. The gripper 460 comprises a tab or flange 462. The tab 462 has one end attached to the flat body 415. The tab 462 includes opposite first and second surfaces. The gripper 460 may include a grip 440. In the illustrated embodiment, the gripper 460 includes a first grip 440 on the first surface of the tab 462. The second surface of the tab 462 is free of a grip and is generally flat and smooth (FIG. 7). In one embodiment (not shown), the gripper 460 may not include a grip such that both the first and second surfaces of the tab 462 are generally flat and smooth. In another embodiment (not shown), the gripper 460 may include a first grip 440 on the first surface of the tab 462 and a second grip (not shown but having a similar configuration to the first grip 440) on the second surface of the tab 462. As is readily apparent and previously indicated, the grip 440 (and any second grip) are analogous to the grips described above.

Figure 6:
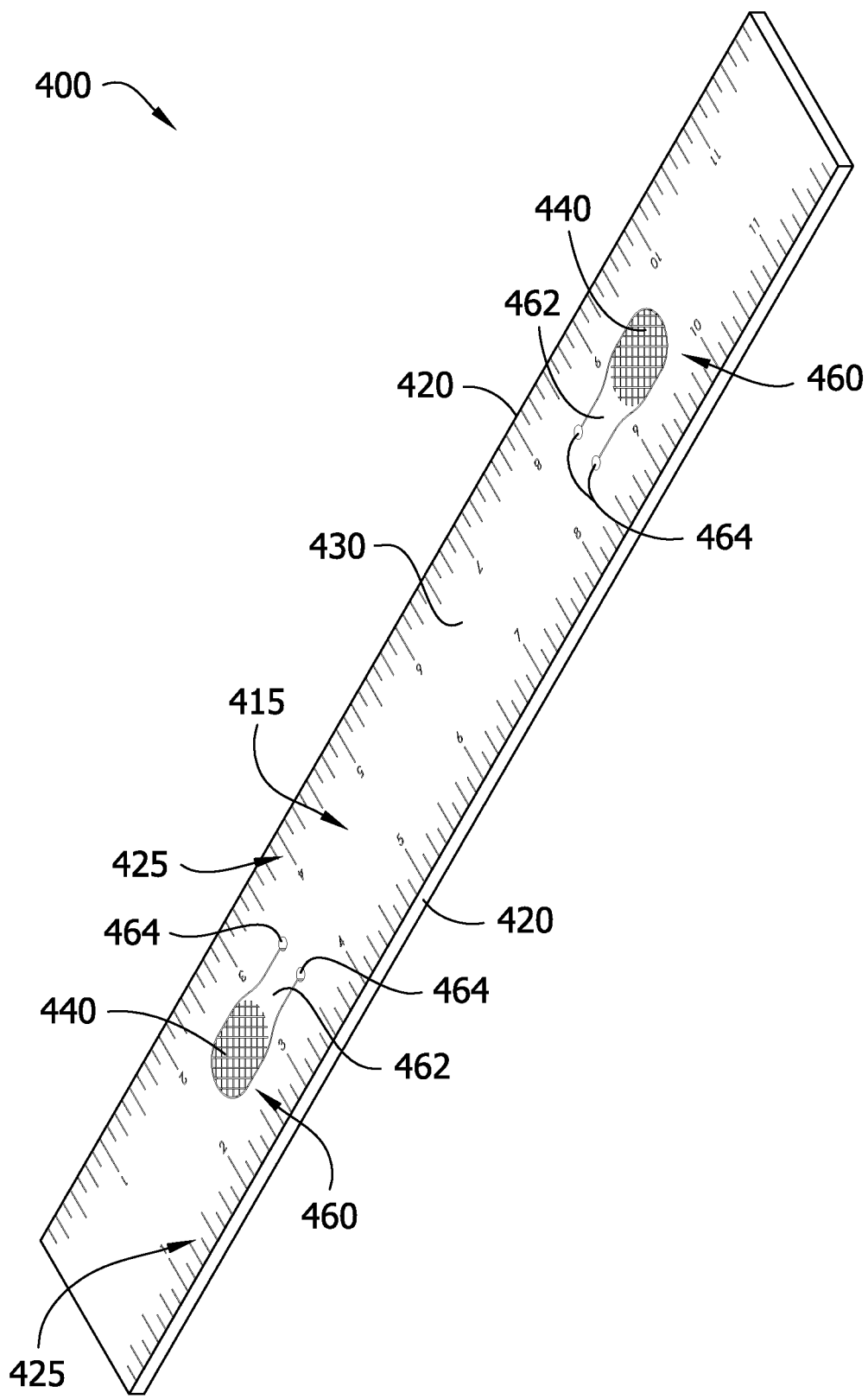
FIG. 6 is a top perspective of a ruler layout tool according to another embodiment of the present disclosure, with grippers in an initial position.
Figure 8:
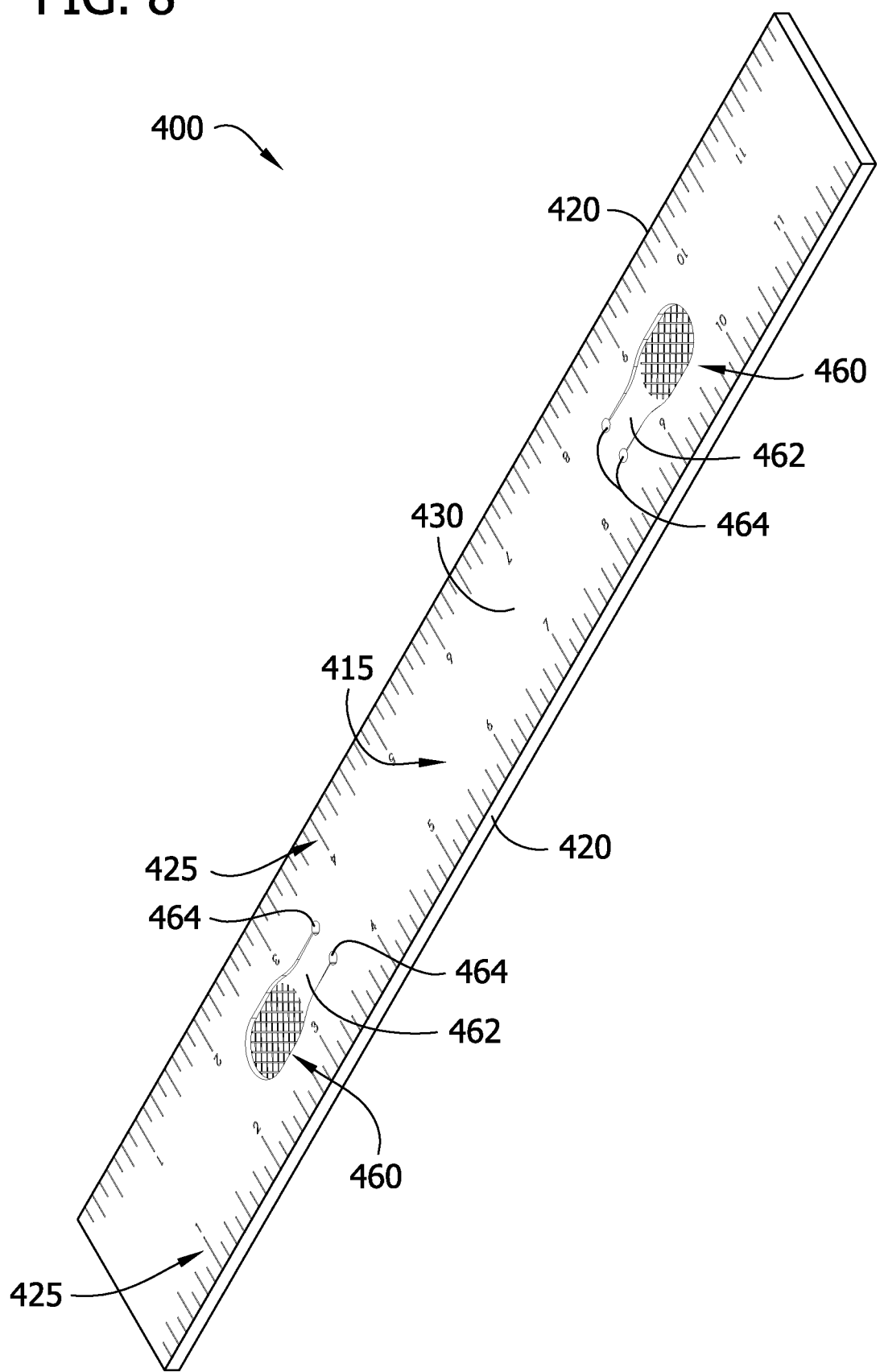
FIG. 8 is a bottom perspective of the ruler layout tool of FIG. 6, with the grippers in a gripping position.
Figure 9:
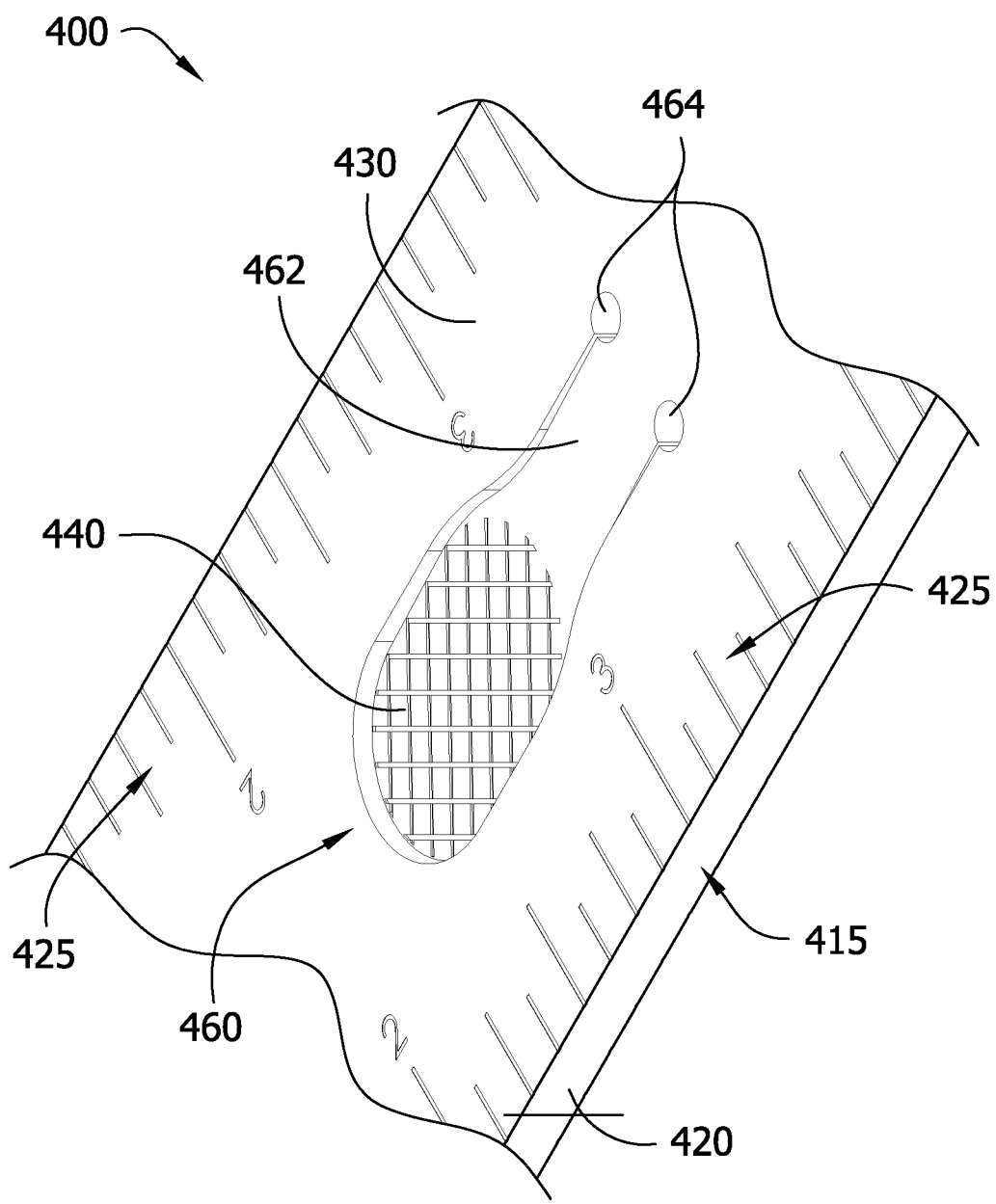
FIG. 9 is an enlarged, fragmentary perspective of the ruler showing the gripper in the gripping position.

The gripper 460 is movable from an initial position, shown in FIGS. 6 and 7. In the initial position, the gripper 460 is generally aligned with the first and/or second surface(s) 430, 432 (e.g., even surface) of the flat body 415. Specifically, the gripper 460 is generally coplanar with the flat body 415 in the initial position (e.g., the first surface of the tab 462 is generally coplanar with the first surface 430 of the flat body 415 and the second surface of the tab 462 is generally coplanar with the second surface 432 of the flat body 415). In other words, in the initial position, the gripper 460 is not disposed exterior or outward of the first and second surfaces 430, 432 of the flat body 415. The gripper 460 is configured to be moved toward the work piece from the initial position to engage the work piece when the flat body 415 overlies the work piece. More specifically, the gripper 460 is movable to a gripping position, as shown in FIGS. 8 and 9, when the gripper 460 is moved from the initial position toward the work piece. The gripper 460 is movable in a first direction (in a direction extending from the second surface 432 toward the first surface 430) from the initial position into the gripping position (e.g., a first gripping position). When the gripper 460 is moved in the first direction, the first grip 440 moves toward and into engagement with the work piece to grip the work piece. In the illustrated embodiment, the gripper 460 is also movable in a second direction (in a direction extending from the first surface 430 toward the second surface 432), which is generally opposite the first direction, from the initial position into the gripping position (e.g., a second gripping position). In the illustrated embodiment, when the gripper 460 is moved in the second direction, the second surface of the tab 462 moves toward and into engagement with the work piece to help grip the work piece. However, it is understood a grip, as described herein, is better at gripping the work piece than the smooth surface of the tab 462. If the gripper 460 includes the second grip, the second grip moves toward and into engagement with the work piece to grip the work piece when the gripper is moved in the second direction. As shown, the gripper 460 is out of alignment with the surfaces 430, 432 of the flat body 415 when in the gripping position (e.g., in either the first or second gripping position). At least a portion of the gripper 460 (e.g., a portion of the grip 440 or tab 462 surface) is disposed exterior or outward of one of the first surface 430 or the second surface 432 of the flat body 415 when the gripper is in the gripping position.

The movement of the gripper 460 out of alignment with the surface (430 or 432) is very small. The movement is enough to increase the friction force of the roughened grip 440 on the work piece, but not so much as to appreciably lift the layout tool 400 off of the work piece. Keeping the surface (430 or 432) against the work piece reduces or eliminates any parallax effect when viewing the indicia 425 against the work piece so that the mark made on the work piece is accurately placed. Preferably, the gripper 460 is resiliently deflectable toward the gripping position (e.g., resiliently deflectable in both the first and second directions). In this manner, after the user disengages the gripper 460, the gripper returns to the initial position from the gripping position. In the illustrated embodiment, the layout tool 400 includes two relief apertures 464 on either side of the end of the tab 462 connected to the flat body 415 to minimize the bending experienced by the flat body 415 when the gripper 460 is deflected into the gripping position by the user. In the embodiments described herein having grippers, the operation and function is the same as described for gripper 460.

In the illustrated embodiment, the gripper 460 is integral with the flat body 415. In one method of manufacture, the gripper 460 is formed from the flat body 415 by cutting a slot in the flat body 415 to define and form the gripper. In another embodiment, the gripper 460 may be separate from and attached to the flat body 415.

In operation, the user lays the layout tool 400 onto a work piece with the first surface 430 of the flat body 415 on the work piece. To move the gripper 460 toward the work piece from the initial position to the gripping position, the user exerts a force on the gripper by pressing down on the smooth, second surface of the tab 462. The force exerted by the user moves the gripper 460 toward the work piece (e.g., into the gripping position). As the gripper 460 is moved in the first direction, the first grip 440 on the gripper engages and grips the work piece. After the layout tool 400 is positioned relative to the work piece, the user utilizes the locating indicia 425 adjacent the linear edge 420 to mark the work piece. After the marking is complete, the user releases the gripper 460, thereby allowing the gripper to return to the initial position.

In an alternative operation of the illustrated embodiment, the user lays the layout tool 400 onto a work piece on the second surface 432 of the flat body 415. To move the gripper 460 toward the work piece from the initial position to the gripping position, the user exerts a force on the gripper by pressing down on the grip 440. The force exerted by the user moves the gripper 460 toward the work piece (e.g., into the gripping position). As the gripper 460 is moved in the second direction, the second surface of the tab 462 engages and grips the work piece. In this arrangement, the grip 440 helps prevent the user's fingers from slipping off the gripper 460. After the layout tool 400 is positioned, the user utilizes the locating indicia 425 adjacent the linear edge 420 to mark the work piece. After the marking is complete, the user releases the gripper 460, thereby allowing the gripper to return to the initial position.

Figure 10:
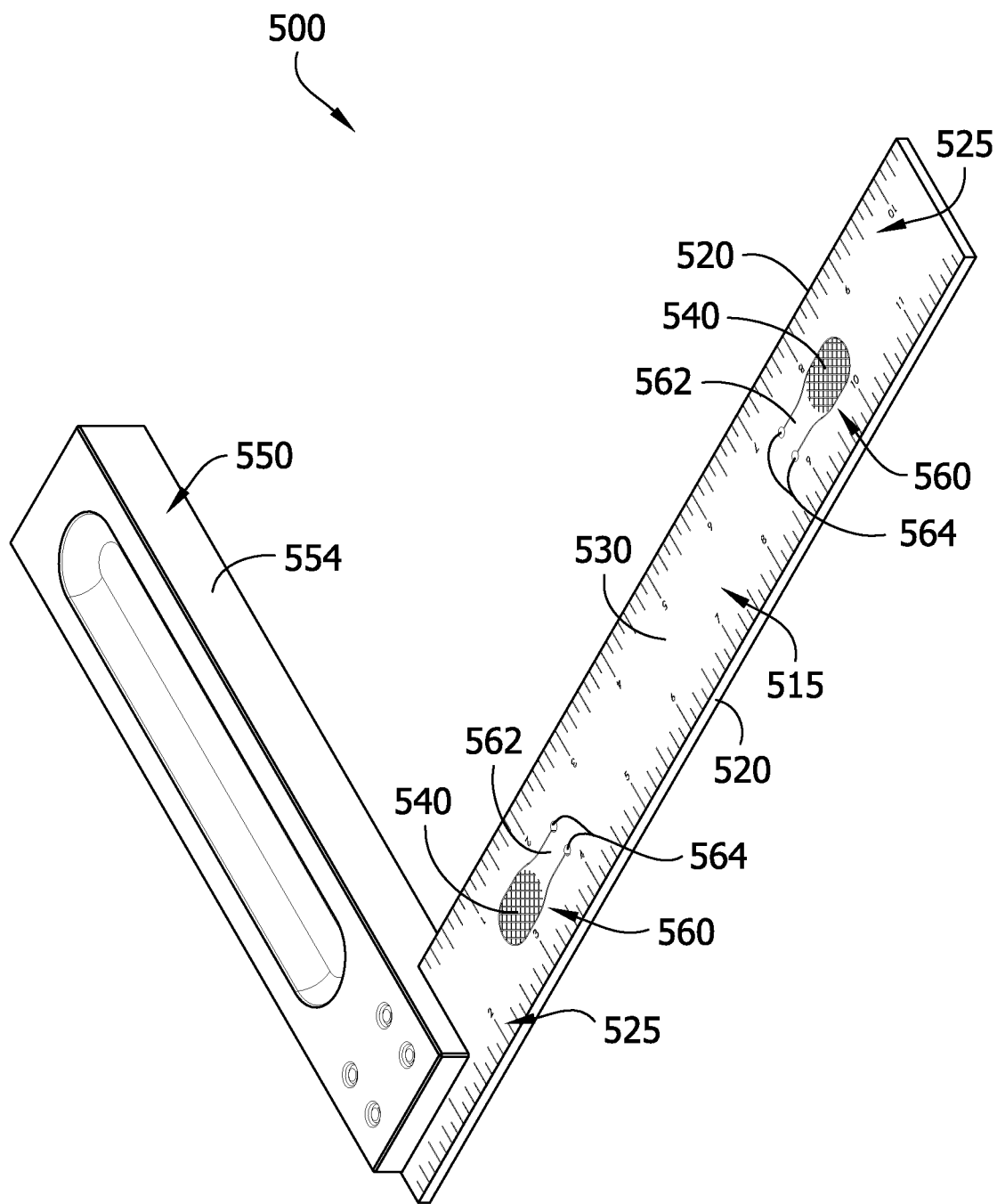
FIG. 10 is top perspective of a L-shaped square layout tool according to another embodiment of the present disclosure.
Figure 11:
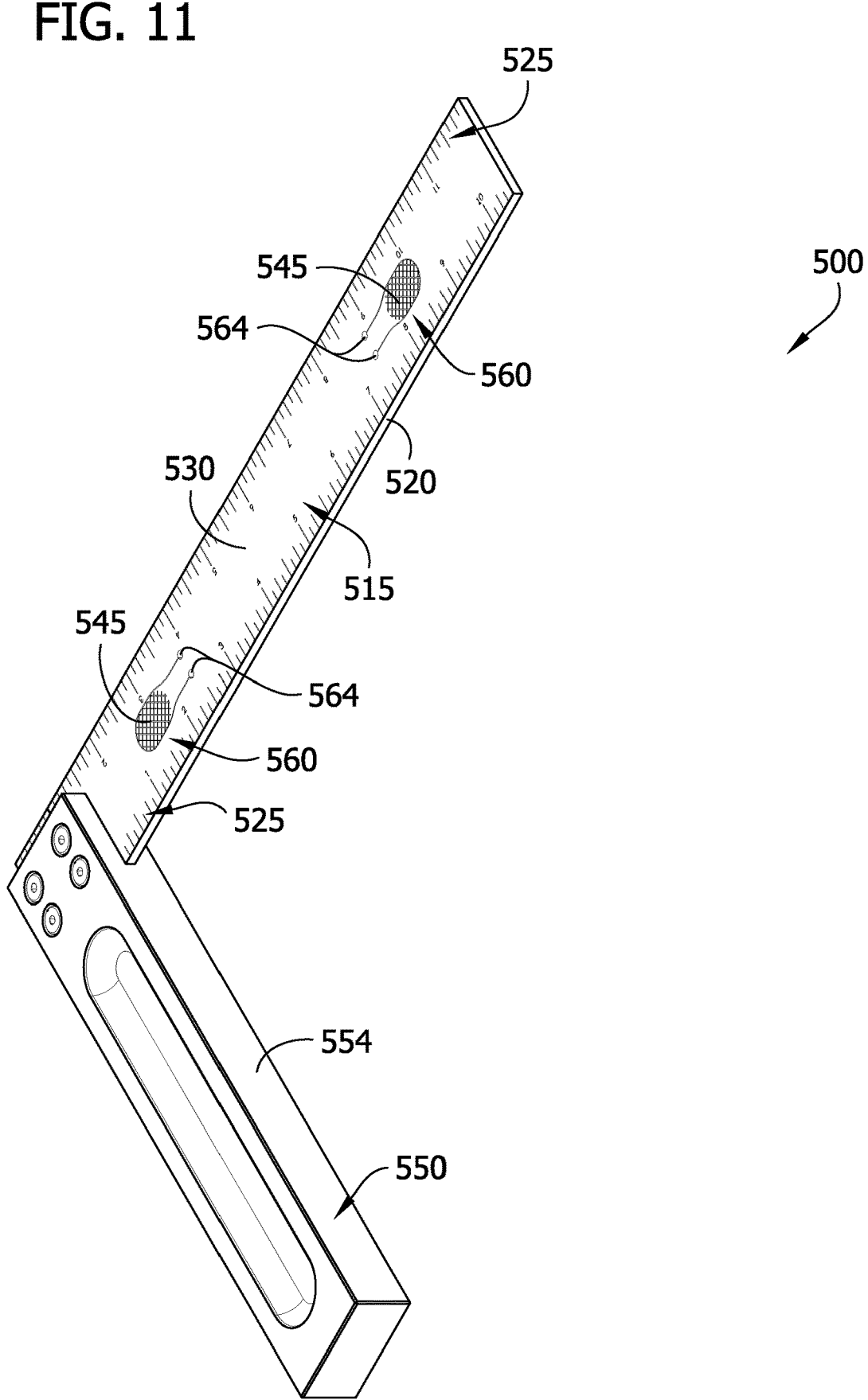
FIG. 11 is a bottom perspective thereof.

Referring to FIGS. 10 and 11, another embodiment of a layout tool according to the present disclosure is generally indicated by reference numeral 500. Layout tool 500 is generally analogous to layout tool 200 and, thus, for ease of description, where similar, analogous or identical parts are used, reference numerals "300" units higher are employed. Moreover, layout tool 500 has some structural features similar to those of layout tool 400 and, thus, for ease of description, where similar, analogous or identical parts are used, reference numerals "100" units higher are employed. Accordingly, unless clearly stated or indicated otherwise, the above descriptions regarding layout tool 200 and layout tool 400 also apply to layout tool 500. In this embodiment, the layout tool 500 comprises an L-shaped square, like layout tool 200, except that the layout tool 500 includes at least one gripper 560, like layout tool 400. Furthermore, the grippers 560 of layout tool 500 includes first and second grips 540, 545 on the first and second sides, respectively of the tab 562.

Figure 12:
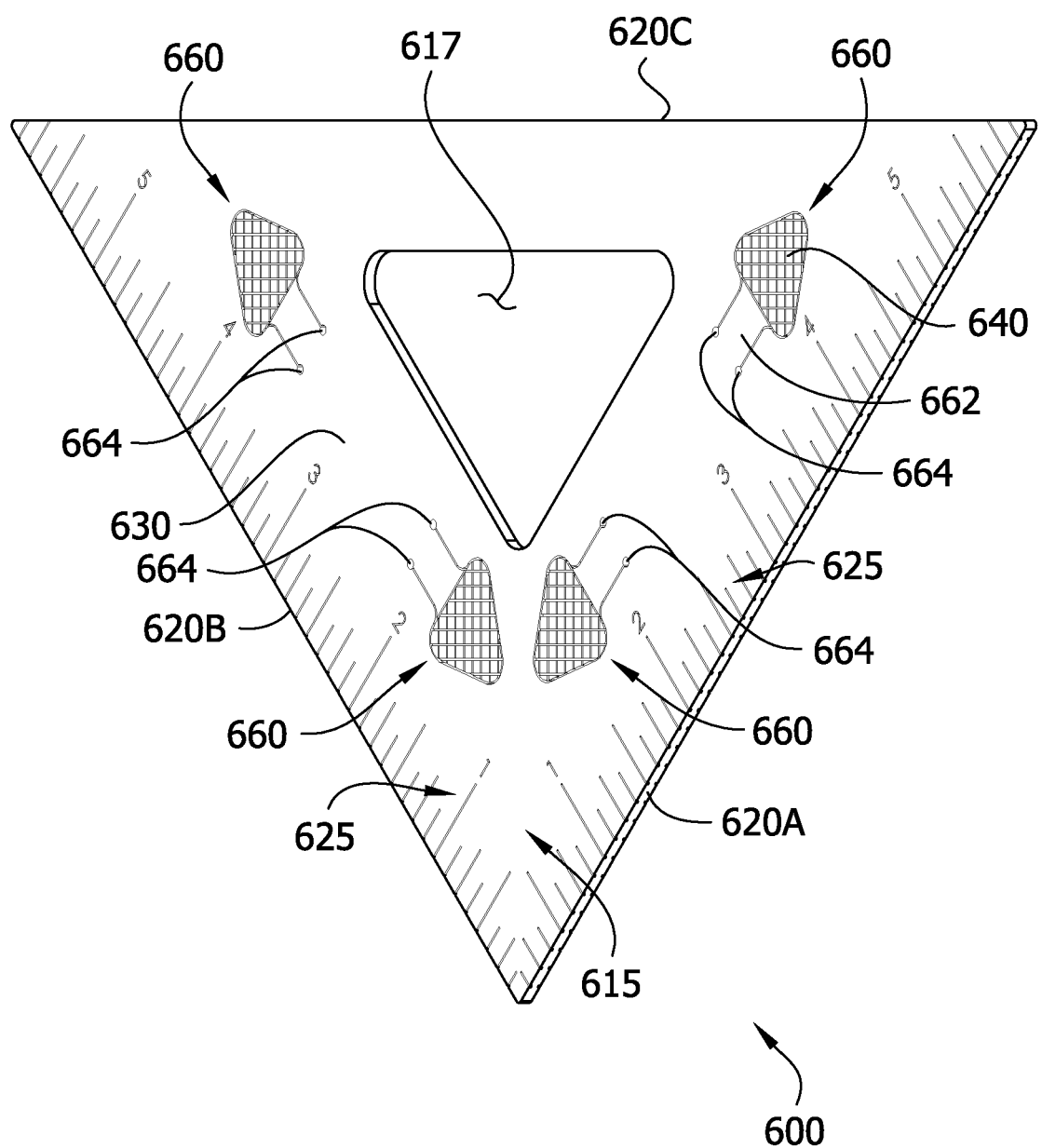
FIG. 12 is a top perspective of a triangle square layout tool according to another embodiment of the present disclosure.
Figure 13:
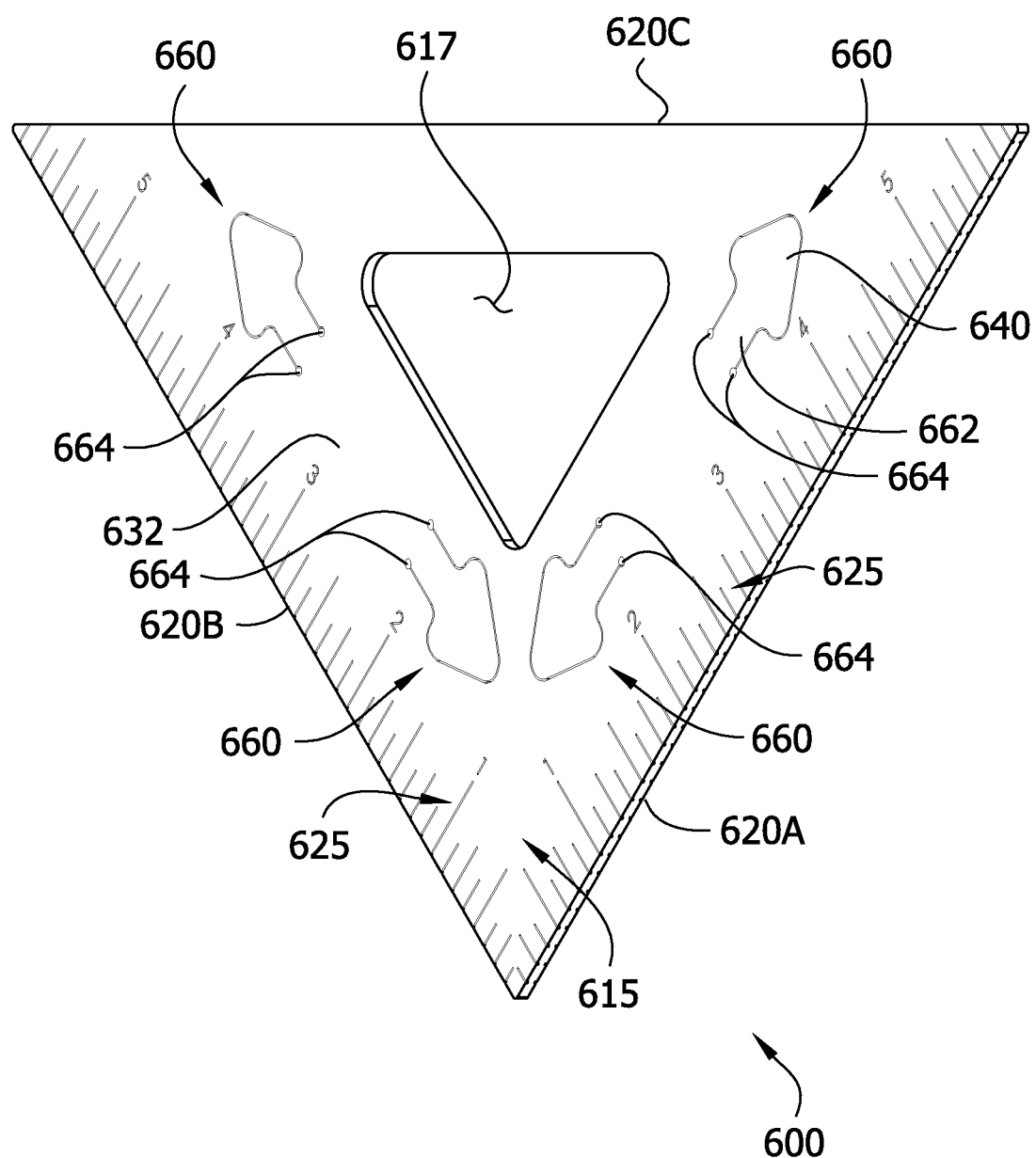
FIG. 13 is a bottom perspective thereof.

Referring to FIGS. 12 and 13, another embodiment of a layout tool according to the present disclosure is generally indicated by reference numeral 600. Layout tool 600 is generally analogous to the layout tool 300 and, thus, for ease of description, where similar, analogous or identical parts are used, reference numerals "300" units higher are employed. Moreover, layout tool 600 has some structural features corresponding to those of layout tool 400 and, thus, for ease of description, where similar, analogous or identical parts are used, reference numerals "200" units higher are employed. Accordingly, unless clearly stated or indicated otherwise, the above descriptions regarding layout tool 300 and layout tool 400 also apply to layout tool 600.

In this embodiment, the layout tool 600 comprises a triangle square, like layout tool 300, except that the layout tool 600 includes at least one gripper 660, like layout tool 400. In the embodiment, the layout tool 600 includes four grippers 660, each having a grip 640 on one side. The grippers 660 are disposed or arranged to facilitate user hand/finger placement during use. Two grippers 660 are spaced apart along and disposed next to the first linear edge 620A to position the user's hand/fingers along the first linear edge when the user uses the first linear edge for marking. Likewise, two grippers 660 are spaced apart along and disposed next to the second linear edge 620B to position the user's hand/fingers along the second linear edge when the user uses the second linear edge for marking. Positioning the user's hand/fingers along the linear edge 620A, 620B the user wishes to use for marking makes it easier to position, hold and control the layout tool 600 on the work piece. Such positioning also helps keep the user's hand holding the layout tool 600 out of the way while the user is marking the work piece.

While particular elements, embodiments, and applications of the present disclosure have been shown and described, it is understood that the disclosure is not limited thereto because modifications may be made by those skilled in the art, particularly in light of the foregoing teaching. It is therefore contemplated by the appended claims to cover such modifications and incorporate those features which come within the spirit and scope of the disclosure.

Having described the disclosure in detail, it will be apparent that modifications and variations are possible without departing from the scope of the disclosure defined in the appended claims.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above constructions, products, and methods without departing from the scope of the disclosure, it is intended that all matter contained in the above description and shown in the accompanying drawings shall be interpreted as illustrative and not in a limiting sense.

The invention claimed is:

1. A layout tool for use in marking a work piece to be cut, the layout tool comprising:
    a generally flat body having an even surface and a linear edge, the even surface lying in a plane; and
    a gripper attached to the flat body and having an exterior surface, the gripper being movable from an initial position, wherein in the initial position the exterior surface of the gripper is coplanar with the plane of the even surface of the flat body, the gripper being configured to be moved toward the work piece from the initial position to engage the work piece when the flat body overlies the work piece;
    wherein the gripper and the flat body are a single, unitary piece of material.

2. The layout tool as set forth in claim 1, wherein the gripper is movable to a gripping position when the gripper is moved from the initial position toward the work piece, wherein in the gripping position the exterior surface of the gripper is out of alignment with the even surface of the flat body.

3. The layout tool as set forth in claim 2, wherein the even surface of the flat body constitutes a first even surface, the flat body further comprising an opposite second even surface.

4. The layout tool as set forth in claim 3, wherein in the gripping position at least a portion of the gripper is disposed exterior of one of the first even surface of the flat body or the second even surface of the flat body.

5. The layout tool as set forth in claim 4, wherein in the initial position the gripper is not disposed exterior of the first even surface and the second even surface of the flat body.

6. The layout tool as set forth in claim 1, wherein the gripper is movable in a first direction from the initial position.

7. The layout tool as set forth in claim 6, wherein the gripper is movable in a second direction from the initial position, the second direction being generally opposite the first direction.

8. The layout tool as set forth in claim 7, wherein the gripper is resiliently deflectable in both the first and second directions.

9. The layout tool as set forth in claim 7, wherein the gripper includes a first grip configured to move toward and into engagement with the work piece when the gripper is moved in the first direction to grip the work piece, the first grip defining the exterior surface.

10. The layout tool as set forth in claim 9, wherein the gripper includes a second grip configured to move toward and into engagement with the work piece when the gripper is moved in the second direction to grip the work piece.

11. The layout tool as set forth in claim 10, wherein the second grip comprises an etched surface.

12. The layout tool as set forth in claim 11, wherein the etched surfaces each comprise a set of intersecting grooves formed into the gripper.

13. The layout tool as set forth in claim 9, wherein the exterior surface of the first grip comprises an etched surface.

14. The layout tool as set forth in claim 1, wherein the gripper is a first gripper, the layout tool further comprising a second gripper having an exterior surface, the second gripper movable from an initial position in which the exterior surface of the second gripper is generally aligned with the even surface of the flat body, the second gripper being configured to be moved toward the work piece from the initial position to engage the work piece when the flat body overlies the work piece.

15. The layout tool as set forth in claim 1, wherein the layout tool is a single, unitary piece of material.

16. The layout tool as set forth in claim 1, wherein the layout tool comprises one of a ruler, a triangle square, or an L-shaped square.

17. The layout tool as set forth in claim 1, wherein the gripper includes a tab having a first end attached to the flat body and an opposite second free end spaced apart from the first end.

18. The layout tool as set forth in claim 1, wherein the flat body surrounds the gripper.

19. The layout tool as set forth in claim 1, wherein in the initial position the exterior surface of the gripper is coplanar with the even surface of the planar body.

20. A layout tool for use in marking a work piece to be cut, the layout tool comprising:
a flat body having a linear edge, the flat body having opposite first and second surfaces, the flat body having a first grip at the first surface and a second grip at the second surface, the first grip beginning at the first surface and extending into the flat body, and the second grip beginning at the second surface and extending into the flat body.

21. The layout tool as set forth in claim 20, wherein the first and second grips are directly opposite one another.

22. The layout tool as set forth in claim 21, wherein the first grip and the second grip each comprise an etched surface.

23. The layout tool as set forth in claim 22, wherein the flat body includes locating indicia adjacent the linear edge, the first and second grips being spaced apart from the locating indicia.

24. The layout tool as set forth in claim 20, wherein the first and second surfaces are planar.

25. The layout tool as set forth in claim 24, wherein the flat body includes a plurality of perimeter edge segments defining a closed perimeter of the flat body, one of the perimeter edge segments of the plurality of perimeter edge segments comprises the linear edge, the plurality of perimeter edge segments bordering the first and second surfaces.

26. The layout tool as set forth in claim 24, wherein an exterior-most surface of the first grip is coplanar with the first surface and an exterior-most surface of the second grip is coplanar with the second grip.

27. The layout tool as set forth in claim 24, wherein the first surface defines a first plane and the second surface defines a second plane, wherein the flat body is free of a feature disposed exteriorly, relative to the flat body, of the first plane, and wherein the flat body is free of a feature disposed exteriorly, relative to the flat body, of the second plane.

28. The layout tool as set forth in claim 20, wherein the flat body is a single, unitary piece of material.

29. A method of making a layout tool, the method comprising:
providing a planar piece of material;
cutting a first slot in the planar piece of material to form a gripper out of the planar piece of material that is attached to a remainder of the planar piece of material, said first slot being the only slot forming the gripper; and
forming a grip on the gripper.

30. The method as set forth in claim 29, wherein said forming a grip includes etching a surface of the portion of the planar piece of material forming the gripper.

31. The method as set forth in claim 30, further comprising forming locating indicia adjacent a linear edge of the planar piece of material, the gripper being spaced apart from the locating indicia.

32. A layout tool for use in marking a work piece to be cut, the layout tool comprising:
a generally flat body having opposite first and second even surfaces and a plurality of perimeter edge segments defining a closed perimeter of the flat body, each of the plurality of perimeter edge segments extending from the first even surface to the second even surface, one of the perimeter edge segments of the plurality of perimeter edge segments being linear; and
a gripper attached to the flat body, the gripper being movable from an initial position, wherein in the initial position the gripper is generally aligned with the flat body, the gripper being configured to be moved toward the work piece from the initial position to engage the work piece when the flat body overlies the work piece.

33. The layout tool as set forth in claim 32, wherein the gripper includes opposite first and second exterior surfaces, the first exterior surface being generally coplanar with the first even surface and the second exterior surface being generally coplanar with the second even surface when the gripper is in the initial position.

34. The layout tool as set forth in claim 32, wherein the first even surface defines a first plane and the second even surface defines a second plane, wherein the flat body is free of a feature disposed exteriorly, relative to the flat body, of the first plane, and wherein the flat body is free of a feature disposed exteriorly, relative to the flat body, of the second plane.

35. The layout tool as set forth in claim 32, wherein the gripper is movable to a gripping position when the gripper is moved from the initial position toward the work piece, wherein in the gripping position the gripper is out of alignment with the flat body.

36. The layout tool as set forth in claim 32, wherein the gripper is movable in a first direction from the initial position and in a second direction from the initial position, the second direction being generally opposite the first direction.

37. The layout tool as set forth in claim 32, wherein the gripper includes a first grip and a second grip, the first grip configured to move toward and into engagement with the work piece when the gripper is moved from the initial position, the second grip configured to move toward and into engagement with the work piece when the gripper is moved from the initial position.

38. A layout tool for use in marking a work piece to be cut, the layout tool comprising:
a generally flat body having an even surfaces and a linear edge; and
a gripper attached to the flat body, the gripper including a first grip and a second grip, the gripper being movable from an initial position in a first direction and being movable from the initial position in a second direction, the gripper being generally aligned with the flat body in the initial position, the first grip being configured to be moved toward and into engagement with the work piece when the gripper is moved from the initial position in the first direction and the flat body overlies the work piece, and the second grip being configured to be moved toward and into engagement with the work piece when the gripper is moved from the initial position in the second direction and the flat body overlies the work piece.

39. The layout tool as set forth in claim 38, wherein the second direction being generally opposite the first direction.

40. The layout tool as set forth in claim 38, wherein the even surface is a first even surface, the flat body having a second even surface opposite the first even surface, the first grip having a first exterior surface and the second grip having a second exterior surface, the first exterior surface being generally coplanar with the first even surface and the second exterior surface being generally coplanar with the second even surface when the gripper is in the initial position.

41. The layout tool as set forth in claim 40, wherein the first even surface defines a first plane and the second even surface defines a second plane, wherein the flat body is free of a feature disposed exteriorly, relative to the flat body, of the first plane, and wherein the flat body is free of a feature disposed exteriorly, relative to the flat body, of the second plane.

42. The layout tool as set forth in claim 38, wherein the gripper is movable to a first gripping position when the gripper is moved from the initial position in the first direction, wherein in the first gripping position the first grip is disposed exterior of the flat body, and wherein the gripper is movable to a second gripping position when the gripper is moved from the initial position in the second direction, wherein in the second gripping position the second grip is disposed exterior of the flat body.

43. The layout tool as set forth in claim 38, wherein the gripper and the flat body are a single, unitary piece of material.

\* \* \* \* \*